United States Patent
Friedl et al.

(10) Patent No.: US 7,060,942 B2
(45) Date of Patent: Jun. 13, 2006

(54) COOKING APPARATUS AND METHOD THEREFOR

(75) Inventors: David Friedl, Montreal (CA); Nitai Friedman, Montreal (CA); Kenneth M. Buckley, Point Claire (CA)

(73) Assignee: Hardt Equipment Manufacturing Inc., Lachine (CA)

( * ) Notice: Subject to any disclaimer, the term of this patent is extended or adjusted under 35 U.S.C. 154(b) by 394 days.

(21) Appl. No.: 10/119,639

(22) Filed: Apr. 10, 2002

(65) Prior Publication Data

US 2002/0174779 A1 Nov. 28, 2002

Related U.S. Application Data

(60) Provisional application No. 60/354,580, filed on Feb. 5, 2002, provisional application No. 60/283,023, filed on Apr. 11, 2001.

(51) Int. Cl.
*A21B 1/22* (2006.01)

(52) U.S. Cl. ............... 219/411; 219/400; 219/389; 219/409; 219/391; 219/386; 99/421 H; 99/419; 99/444; 99/447; 99/401; 126/41 R; 126/21 AS; 126/273.5; 126/92 B

(58) Field of Classification Search ............... 99/421 H, 99/419, 444, 447, 401, 385, 386; 219/411, 219/389, 391, 400, 409; 126/41 R, 21 A, 126/273.5, 92 B, 92 C See application file for complete search history.

(56) References Cited

U.S. PATENT DOCUMENTS

| | | | |
|---|---|---|---|
| 2,253,665 A | 8/1941 | Backus et al. | |
| 2,600,760 A | 6/1952 | Guffey | |
| 2,790,380 A | 4/1957 | Shryack | |
| 2,952,762 A | 9/1960 | Williams et al. | |
| 2,956,497 A | 10/1960 | Bernstein | |
| 2,969,450 A | 1/1961 | Bernstein | |
| 3,074,360 A | 1/1963 | Vaughan | |
| 3,138,697 A | 6/1964 | Banca et al. | |
| 3,214,566 A | 10/1965 | Wilson | |
| 3,448,678 A | 6/1969 | Burstein | |
| 3,529,556 A | 9/1970 | Barnes | |

(Continued)

FOREIGN PATENT DOCUMENTS

DE 197 07 896 A 1 9/1998

(Continued)

OTHER PUBLICATIONS

EPO Communication dated Oct. 27, 2005 from corresponding EPO Application No. 02740989.5.

*Primary Examiner*—Shawntina Fuqua
(74) *Attorney, Agent, or Firm*—Wallenstein Wagner & Rockey, Ltd.

(57) ABSTRACT

An apparatus for cooking a food item therein has a housing defining an interior and includes at least first and second opposed walls. A rotating member is positioned between the first and second walls of the housing, and the rotating member is capable of engaging and rotating the food item. A drive mechanism is mounted on the apparatus for rotating the rotating member. A heating element is positioned adjacent the second wall of the housing, and a blackbody radiator is positioned between the rotating member and the heating element. The heating element heats a first side of the blackbody radiator and a second side of the blackbody radiator emits radiation in a highly effective wavelength spectrum toward the food item. The apparatus also includes a self cleaning system for cleaning the interior.

8 Claims, 12 Drawing Sheets

U.S. PATENT DOCUMENTS

| | | | |
|---|---|---|---|
| 3,861,290 A | | 1/1975 | Ringo |
| 3,933,145 A | | 1/1976 | Reich |
| 3,951,052 A | | 4/1976 | Ringo |
| 4,068,572 A | | 1/1978 | Vogt |
| 4,300,523 A | | 11/1981 | Robertson et al. |
| 4,441,015 A | | 4/1984 | Eichelberger et al. |
| 4,455,319 A | | 6/1984 | Clark |
| 4,486,652 A | * | 12/1984 | Muka et al. ............... 219/553 |
| 4,510,854 A | | 4/1985 | Robertson |
| 4,561,348 A | | 12/1985 | Halters et al. |
| 4,574,689 A | | 3/1986 | Robertson |
| 4,590,848 A | | 5/1986 | Willingham |
| 4,591,333 A | | 5/1986 | Henke |
| 4,810,856 A | | 3/1989 | Jovanovic |
| 4,839,502 A | * | 6/1989 | Swanson et al. ............ 219/401 |
| 4,914,276 A | * | 4/1990 | Blair .......................... 219/390 |
| 4,968,515 A | | 11/1990 | Burkett et al. |
| 4,985,607 A | | 1/1991 | Oya |
| 5,044,262 A | | 9/1991 | Burkett et al. |
| 5,101,715 A | | 4/1992 | Liu |
| 5,271,316 A | | 12/1993 | Wisting |
| 5,308,956 A | | 5/1994 | Halters |
| 5,361,686 A | | 11/1994 | Koopman |
| 5,373,778 A | | 12/1994 | Moreth |
| 5,451,744 A | | 9/1995 | Koopman et al. |
| 5,485,780 A | | 1/1996 | Koether et al. |
| 5,535,733 A | * | 7/1996 | Hait ............................ 126/59 |
| 5,560,285 A | * | 10/1996 | Moreth ..................... 99/421 H |
| 5,598,769 A | | 2/1997 | Luebke et al. |
| 5,639,497 A | | 6/1997 | Bedford et al. |
| 5,704,278 A | | 1/1998 | Cross |
| 5,801,362 A | | 9/1998 | Pearlman et al. |
| 5,996,572 A | | 12/1999 | Hagan |
| 6,012,444 A | * | 1/2000 | Skender .................... 126/41 R |
| 6,041,695 A | | 3/2000 | Kuopus |
| 6,123,014 A | | 9/2000 | Jo |
| 6,131,559 A | * | 10/2000 | Norris et al. ............. 126/21 A |
| 6,142,064 A | | 11/2000 | Backus et al. |
| 6,170,390 B1 | | 1/2001 | Backus et al. |
| 6,173,645 B1 | | 1/2001 | Backus et al. |
| 6,240,838 B1 | | 6/2001 | Backus et al. |
| 6,250,210 B1 | * | 6/2001 | Moreth ........................ 99/331 |
| 6,250,214 B1 | | 6/2001 | Backus et al. |
| 6,307,185 B1 | * | 10/2001 | Loveless .................... 219/400 |
| 6,330,855 B1 | | 12/2001 | Backus et al. |
| 2001/0009128 A1 | | 7/2001 | Backus et al. |
| 2001/0022140 A1 | | 9/2001 | Backus et al. |
| 2001/0032547 A1 | | 10/2001 | Backus et al. |
| 2001/0042449 A1 | | 11/2001 | Backus et al. |
| 2002/0017201 A1 | | 2/2002 | Backus et al. |
| 2002/0023545 A1 | | 2/2002 | Backus et al. |
| 2002/0023546 A1 | | 2/2002 | Backus et al. |
| 2002/0023547 A1 | | 2/2002 | Backus et al. |
| 2002/0050212 A1 | | 5/2002 | Backus et al. |

FOREIGN PATENT DOCUMENTS

| | | |
|---|---|---|
| EP | 0 236 150 A1 | 9/1987 |
| EP | 0 286 759 A2 | 10/1988 |
| EP | 0 395 595 A1 | 10/1990 |
| EP | 0 463 657 B1 | 1/1992 |
| EP | 0 612 494 A1 | 8/1994 |
| FR | 2 551 644 A2 | 3/1985 |
| GB | 1 328 755 | 9/1973 |

* cited by examiner

SPECTRAL ABSORPTION CURVE FOR WATER

% OF INFRARED RADIATION EMITTED FROM A BLACKBODY BETWEEN 3 AND 10 μm

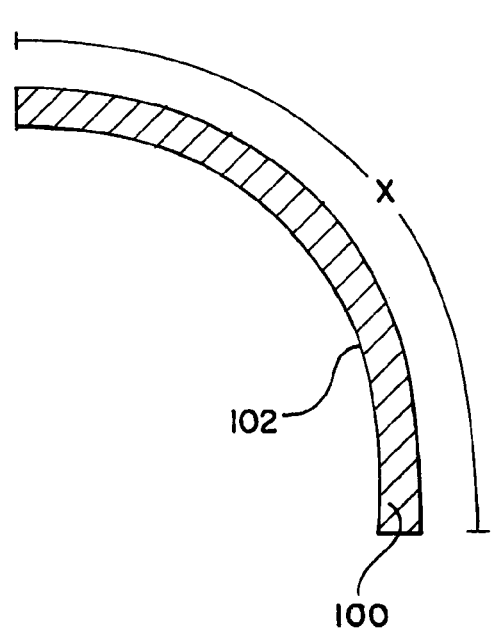
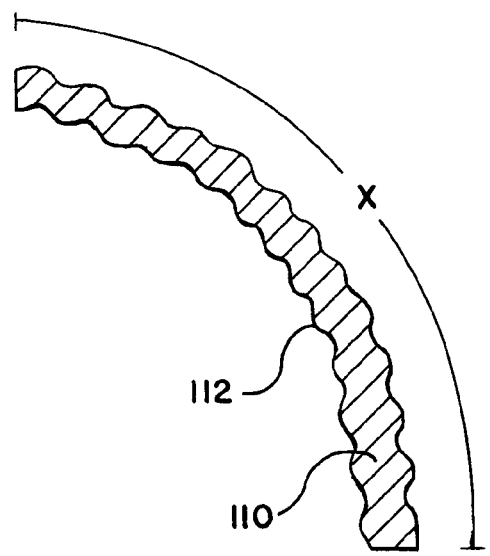
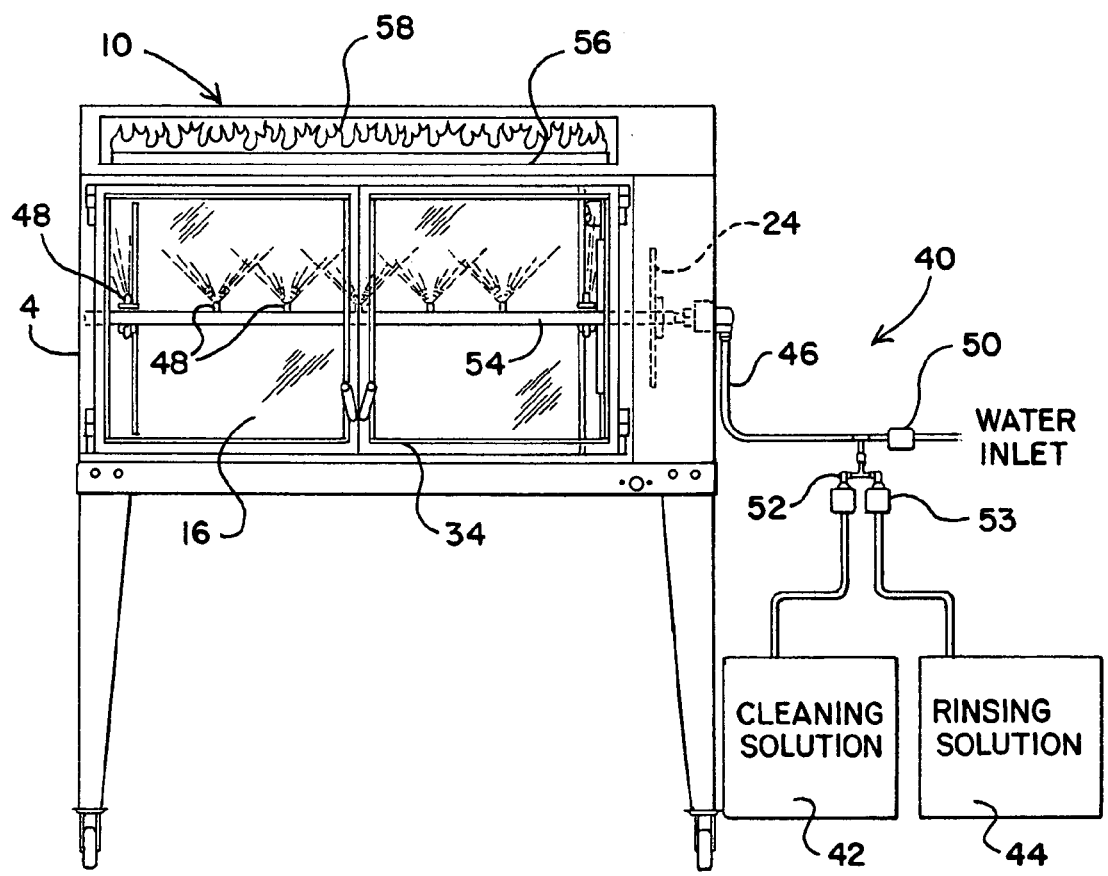

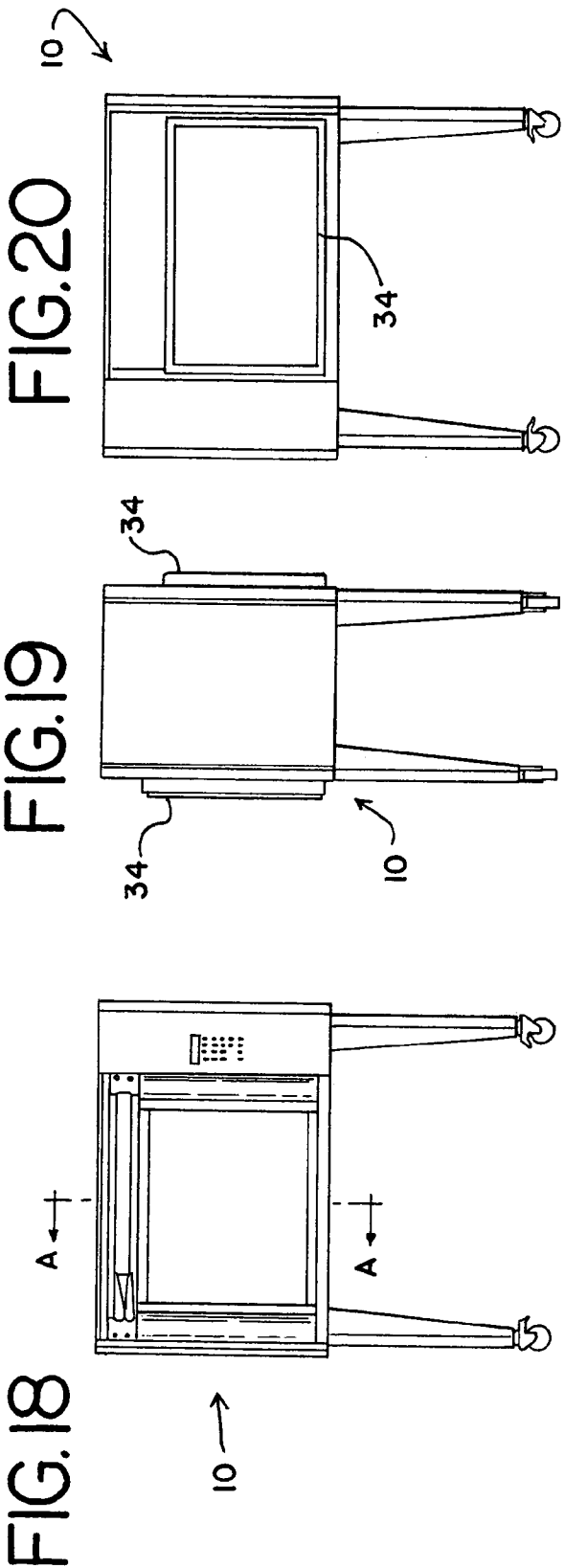

COOKING APPARATUS AND METHOD THEREFOR

RELATED APPLICATIONS

The present application claims the benefit of provisional Application No. 60/283,023 filed on Apr. 11, 2001, and co-pending provisional Application No. 60/354,580, filed on Feb. 5, 2002.

TECHNICAL FIELD

The present invention relates to a cooking apparatus and method therefor, and to a system and method for self-cleaning the cooking apparatus. More particularly, the invention relates to a rotisserie oven that uses blackbody radiation for cooking a food item therein.

BACKGROUND OF THE INVENTION

Rotisserie ovens are well-known. There are generally two basic rotisserie oven designs: 1) vertical; and 2) carousel/dual rotation. Each design can employ either a gas or electric burner.

The vertical oven design incorporates an array of skewers positioned vertically adjacent to the back wall of the unit. A plurality of heating elements, similar to the number of skewers are positioned adjacent to the back wall of the oven and between the array of skewers and the back wall. These elements emit energy onto the product as it rotates in front of the heating elements. These heating elements are generally electric heating elements, gas burners or any combination thereof. Furthermore, to enhance the cooking process, it is desirable to have a large surface area emitting radiation. Electric heating elements are generally thin and, therefore, have little surface area for emitting radiation.

The dual rotation oven design generally incorporates a planetary gear arrangement that serves as the drive mechanism. This drive mechanism is mounted within the interior cavity of the oven. In the example of a conventional gas rotisserie, there is generally a primary heat source that consists of an infrared heating element, mounted adjacent to the front wall in the upper portion such that the energy emitting from the burner is directed towards the product. This infrared burner is generally constructed from ceramic or Inconel sheathed material. Optionally, positioned adjacent to the back wall near the bottom of the rotisserie is a tubular-burner, heating element. As the product being cooked rotates within the cooking cavity, it is periodically exposed to the intense searing heat from the infrared burner as it passes. In such designs, the heating elements are sometimes required to generate heat to 1600 degrees Fahrenheit. High temperature heat is required to keep both the ignition system and the burners operating, as well as to heat the cooking cavity and the large cold mass. For example, the large cold mass can consist of 40 chickens, each weighing approximately 3 pounds, that must be raised from 38 degrees Fahrenheit to 185 degrees Fahrenheit during the cooking process.

The carousel oven consists of a drive mechanism that supports the product as it is being rotated within the cavity of the oven, allowing the product to hang freely while supported on both ends. Generally, carousel ovens utilize electric elements as the heat source. In the example of a conventional electric rotisserie, the electric heating elements are mounted in a plurality of positions throughout the interior cavity adjacent to the interior roof structure, the front wall and the back wall of the rotisserie. These elements are positioned such that they attempt to provide even heat distribution to all surfaces of the product.

In addition, current rotisseries are incapable of self-cleaning (spray-down), without subjecting the rotisserie components to water damage. For example, open-faced burners, spark/pilot ignition systems and ceramics used in these ovens are susceptible to water damage. This prevents spray down capability.

The present invention is provided to solve these and other problems.

SUMMARY OF THE INVENTION

The present invention provides an oven for cooking a food item therein. The oven utilizes blackbody radiation to cook a food item placed therein. The oven has a housing defining an interior of the oven, a rotating member, a drive mechanism, a heating element and a blackbody radiator. A blackbody is any material that once heated to certain temperatures, emits radiation energy at a highly effective wavelength for cooking food products. In one preferred embodiment, the oven is a rotisserie oven.

The housing includes a first wall and a second wall opposite the first wall, a top and bottom. The housing also has a first aperture for providing airflow into the heating element and a second aperture for providing airflow out of the housing. Preferably, the housing has a door adjacent the first wall of the housing to allow an operator to access the food item therein.

The rotating member is positioned between the first and second walls of the housing. The rotating member engages and rotates the food item in either a clockwise or a counterclockwise direction. Preferably, the rotating member is a skewer. The drive mechanism is mounted on the oven for rotating the skewer.

In one preferred embodiment, the heating element is positioned adjacent the second wall of the housing, and the blackbody radiator is positioned between the rotating member and the heating element. Preferably, the blackbody radiator is modulated at various temperatures to achieve various results. Preferably, the blackbody radiator has a plurality of tabs for gathering heat emanating from the heating element and spreading the heat into the blackbody radiator. For the process of cooking, the temperature that the blackbody radiator remits radiation effectively for cooking food, within the 3–10 μm wavelength, is in the range of 400–1400 degrees Fahrenheit. At this temperature range, 60% of the blackbody radiation is within the 3–10 micrometer range, with peak effectiveness in excess of 70% at approximately 900 degrees Fahrenheit.

The blackbody radiator emits radiation toward the rotating member to cook the food item. Preferably, the blackbody radiator is curve-shaped, or is in a similar plane as the product being cooked or otherwise profiled to provide a larger radiation surface to the product. The blackbody radiator is made from materials that have strong emissivity (i.e., ability to emit radiant energy) and are not water sensitive, nor damaged by the cleaning process. In one preferred embodiment, the blackbody radiator is made from steel. In another preferred embodiment, the blackbody radiator is made from iron. It is understood, however, that all steel/iron/alloy/metal variations are possible that emit radiant energy in the highly effective wavelength range for cooking food items.

According to another aspect of the invention, the rotisserie oven has a self-cleaning system. The self-cleaning system includes a system of jets that are capable of spraying cleaning solution and water into the cooking cavity of the oven. In one preferred embodiment, the jets are positioned within a main shaft of a drive mechanism of the oven. The cleaning system may be controlled by a separate controller.

According to another aspect of the invention, the rotisserie oven has a decorative flame positioned remote from the cooking cavity.

The present invention also provides a method of cooking a food item in an oven. The method includes providing an oven having a housing defining an interior of the oven and including a first wall and a second wall opposite the first wall. The oven has a rotating member positioned between the first and second walls of the housing, and a drive mechanism mounted on the oven. The oven has a heating element positioned adjacent the second wall of the housing, and a blackbody radiator positioned between the rotating member and the heating element. In one preferred embodiment, the blackbody radiator is a steel or iron radiator. An operator inserts the food item into the oven and the heating element heats one side of the blackbody radiator to a temperature between 400 and 1400 degrees Fahrenheit. The surface of the blackbody radiator emits dark infrared radiation toward the food item at a wavelength generally within the 3–10 micrometer range. The dark infrared radiation cooks the food item to its desired temperature.

Other features and advantages of the invention will be apparent from the following specification taken in conjunction with the following drawings.

BRIEF DESCRIPTION OF THE DRAWINGS

FIG. 9 is a cross-sectional view of a blackbody radiator according to the present invention;

FIG. 10 is a cross-sectional view of an alternative blackbody radiator;

FIG. 11 is a front elevation view of another embodiment of an oven depicting a self-cleaning system;

FIG. 18 is a front elevation view of yet another embodiment of an oven of the present invention;

FIG. 19 is a side elevation view of the oven of FIG. 18;

FIG. 20 is a rear elevation view of the oven of FIG. 18;

FIG. 21 is a top view of the oven of FIG. 18;

FIG. 22 is a front perspective view of the oven of FIG. 18;

FIG. 23 is a rear perspective view of the oven of FIG. 18;

DETAILED DESCRIPTION OF THE PREFERRED EMBODIMENT

Figure 2:
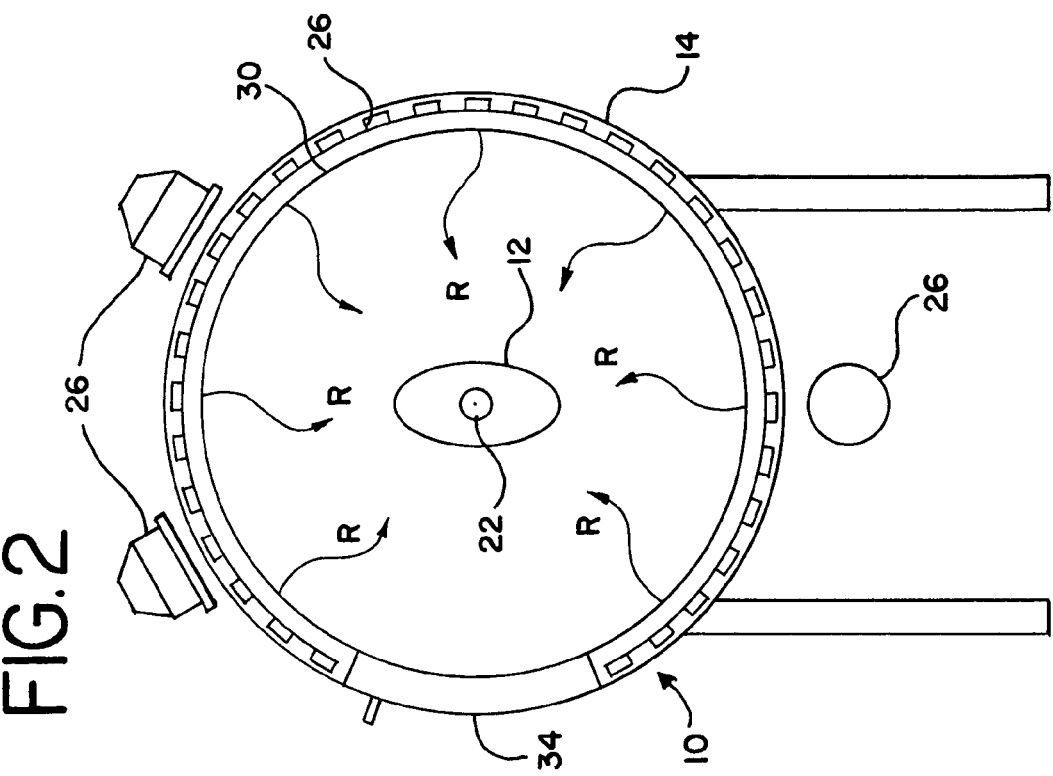
FIG. 2 is a cross-sectional schematic view of an oven utilizing a blackbody radiator.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
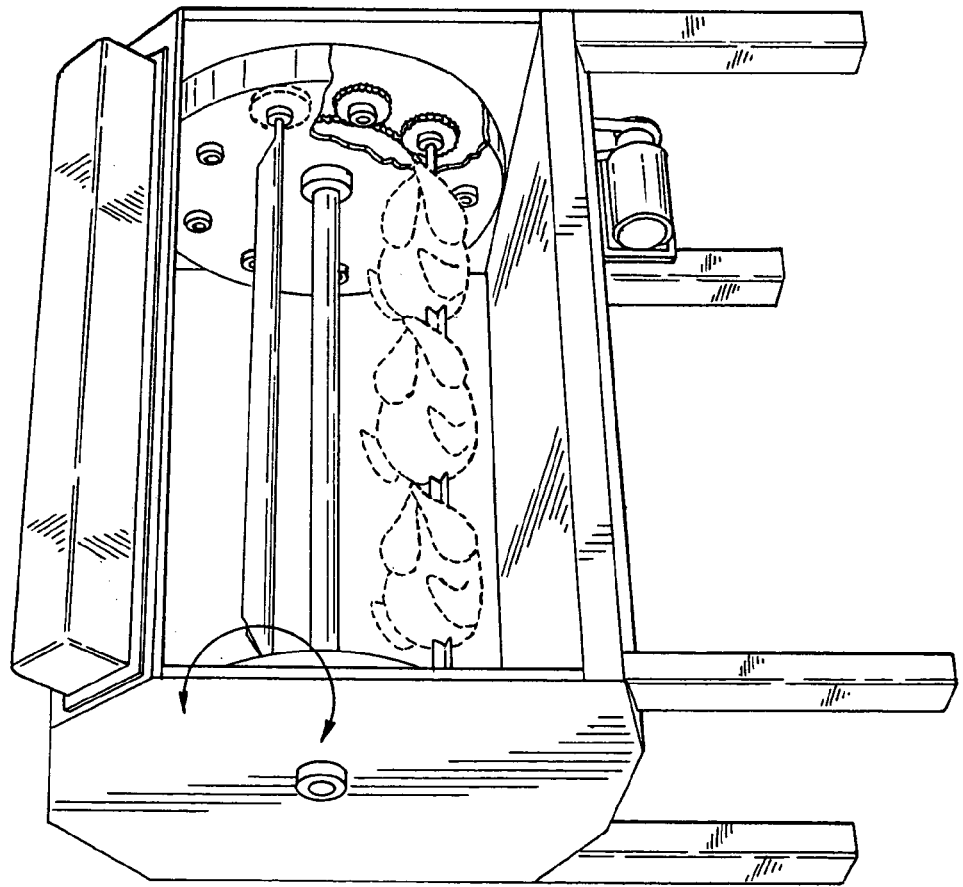
FIG. 1 is a perspective view of a rotisserie oven.

Referring now in detail to the Figures, FIG. 1 discloses a rotisserie oven that can incorporate the present invention.

FIG. 2 illustrates an oven 10 for cooking a food item 12 according to the present invention. The oven 10 utilizes a blackbody radiator to cook the food item 12. The oven 10 generally includes a housing 14 in the form of a blackbody radiator 30, a skewer 22 and a heating element 26. The housing 14 is barrel-shaped and completely surrounds the food item 12. The housing 14 could take other forms. The housing 14 has an access door 34 for placing the food item 12 on the skewer 22 and in the housing 14. The heating element 26 can take different forms from a burner placed below the housing 14, an infrared burner placed above the housing 14, or an electric heating element embedded in the housing 14 or around the housing 14. The heating element 26, in any form, merely is required to heat the housing 14. Only a single heating element is required. Because the housing 14 takes the form of blackbody radiator 30, once heated, it will emit radiation R toward the food item 12 in a highly effective wavelength for cooking food, preferably in the 3–10 μm range. The amount of radiation emitted by the radiator 30 is maximized in a specific temperature range based on the type of blackbody radiator 30. For example, and as explained in greater detail below, an iron radiator can be used with a temperature in the range of 400–1400 degrees Fahrenheit. Because the housing 14 completely surrounds the food item 12, the maximum amount of radiation emitting surface area is achieved to cook the food item 12.

Figure 3:
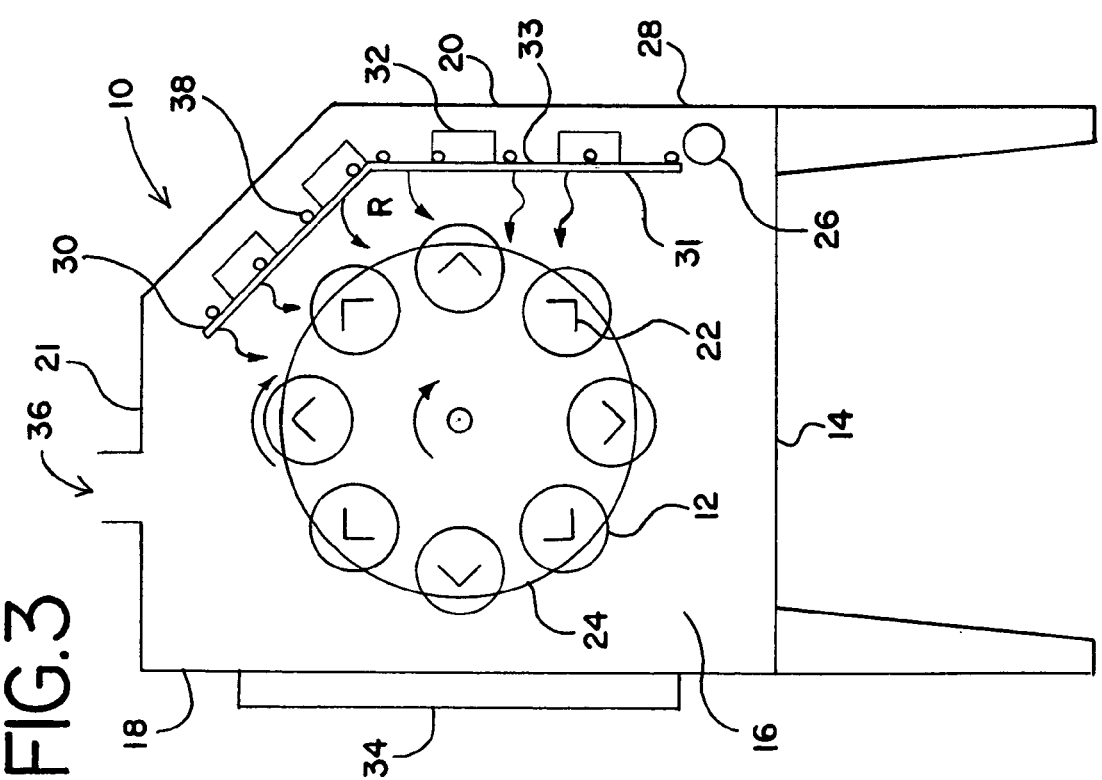
FIG. 3 is a cross-sectional schematic view of an embodiment of a rotisserie oven according to the present invention.

FIG. 3 illustrates an oven 10, such as a rotisserie oven 10, for cooking a food item 12 therein. The oven 10 generally includes a housing 14, a skewer 22, a drive mechanism 24, a heating element 26, and a blackbody radiator 30.

The housing 14 defines an interior 16 of the oven 10. The housing 14 has a first wall 18 and a second wall 20 opposite the first wall 18. Preferably, the first wall 18 has a door 34 for providing access to the food item 12 in the interior 16 of the oven 10. The housing further has a ceiling 21 positioned between the first wall 18 and the second wall 20. The ceiling has an exhaust opening 36. The second wall 20 has an air inlet opening 28. In one preferred embodiment, the housing 14 has a generally rectangular cross-section although it is understood that the housing 14 can take various other forms.

The skewer 22, or spit, is positioned between the first wall 18 and the second wall 20 of the housing 14. In a preferred embodiment, the oven 10 utilizes a plurality of skewers 22. The skewer 22 passes through and holds the food item 12 to be cooked. The drive mechanism 24 is mounted within the housing 14 and is connected to the skewers 22. The drive mechanism 24 rotates the skewer and food item 12 in a first clockwise or counterclockwise direction as indicated by the arrows in FIG. 3. The drive mechanism 24 can also rotate each individual skewer 22, as the skewers 22 move in the first direction. This assures that all sides of the food item 12, such as a chicken, are cooked uniformly. The heating element 26 is positioned adjacent the second wall 20 of the housing 14. In this embodiment, the heating element 26 is in the form of a gas-fired burner 26. However, the use of other heating elements is contemplated.

The blackbody radiator 30 is generally a member that is heated by the burner 26 to cook the food items 12. A blackbody is any material that once heated to specific temperatures, radiates energy in a highly effective spectrum. The blackbody surface, such as iron, stainless steel and any metal alloys, completely absorbs all radiant energy of any wavelength falling upon it with no reflection of energy. Use of the blackbody radiator 30 in cooking the food items 12 will be explained in greater detail below.

The blackbody radiator 30 is curved shaped, and or is in a similar plane as the product being cooked or otherwise profiled to present a larger radiation surface to the product. The blackbody radiator 30 can be comprised of separate members connected together such as by welding, or the blackbody radiator 30 could be made from a solid, integral member. The blackbody radiator 30 has a first side 31 and a second side 33. The blackbody radiator 30 also has a plurality of protruding members, such as a tab 32, attached to the second side 33 of the blackbody radiator 30 and protruding toward the second wall 20. The tab 32 may be welded to the blackbody radiator 30, or attached to the blackbody radiator 30 by other attachment means known to those skilled in the art. The blackbody radiator 30 can have a plurality of temperature sensors 38 placed on the radiator 30 for monitoring temperature. The blackbody radiator 30 is positioned within the housing 14 and generally between the skewers 22 and the second wall 20 of the housing 14. The blackbody radiator 30 is spaced from the second wall 20 and the burner 26 is positioned generally between the blackbody radiator 30 and the second wall 20. The second side 33 of the blackbody radiator 30 is heated by the burner 26. As explained in greater detail below, the radiative properties from the first side 31 of the blackbody radiator 30 are used to cook the food item 12. In one preferred embodiment, the blackbody radiator 30 is made of cast iron. Iron radiates energy in a highly effective spectrum for cooking food products. Other materials that radiate energy in an effective spectrum can also be used such as other metal alloys or stainless steel.

In operation, an open flame from the gas burner generates heat. Air enters the oven 10 through the air inlet opening 28 in the second wall 20. Heat rises from the burner 26 between the blackbody radiator 30 and the second wall 20. Preferably, the burner 26 heats the blackbody radiator 30 to a temperature in the range of 400 to 1400 degrees Fahrenheit to optimize cooking conditions. The tabs 32 assist the blackbody radiator 30 in reaching this temperature range by gathering heat from the heating element 26 and spreading the heat into the blackbody radiator 30. As the second side 33 of the blackbody radiator 30 is heated, the blackbody radiator 30 emits radiation from the first side 31 of the blackbody radiator 30 towards the skewers 22 to cook the food item 14. Exhaust from the burner 26 is allowed to escape through the opening 36.

Figure 7:
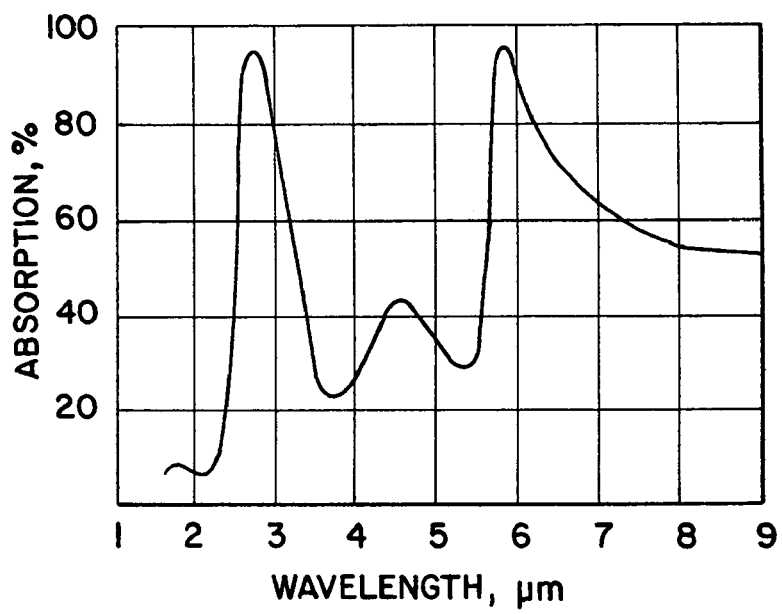
FIG. 7 is a spectral absorption curve for water.
Figure 8:
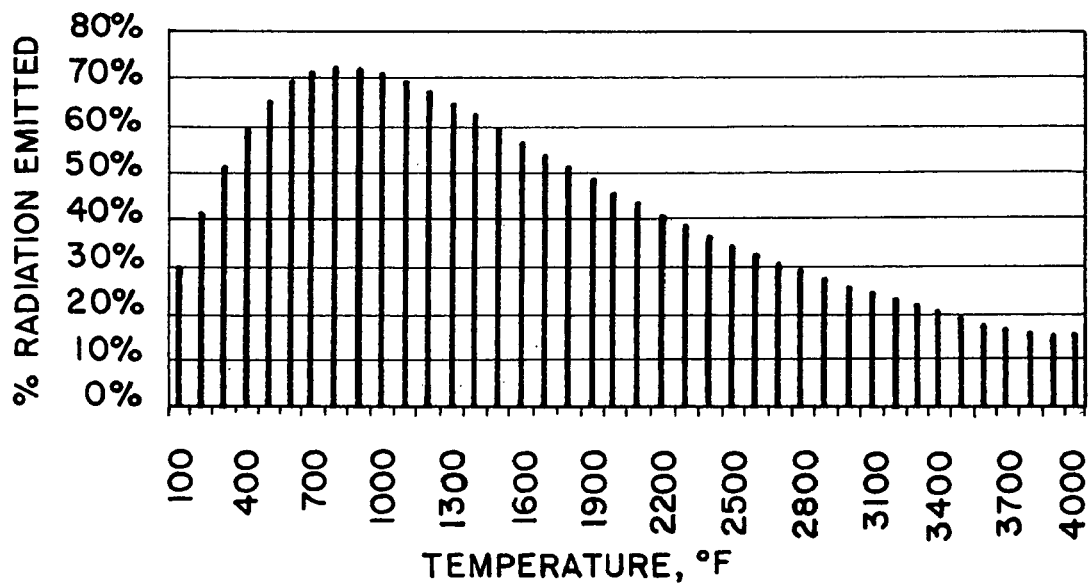
FIG. 8 is a curve showing the percentage of infrared radiation emitted from a blackbody between 3–10 μm.
Figure 12:
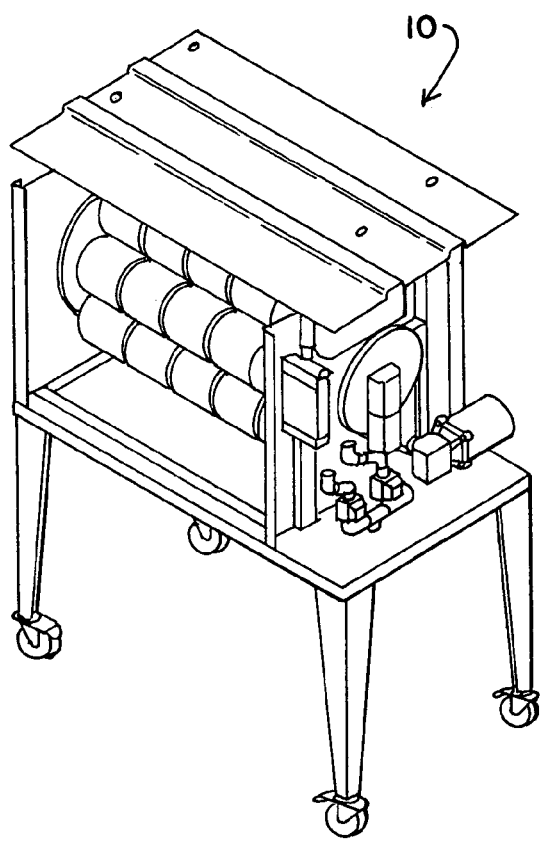
FIG. 12 is a perspective view of an embodiment of an oven with portions of the housing removed.
Figure 13:
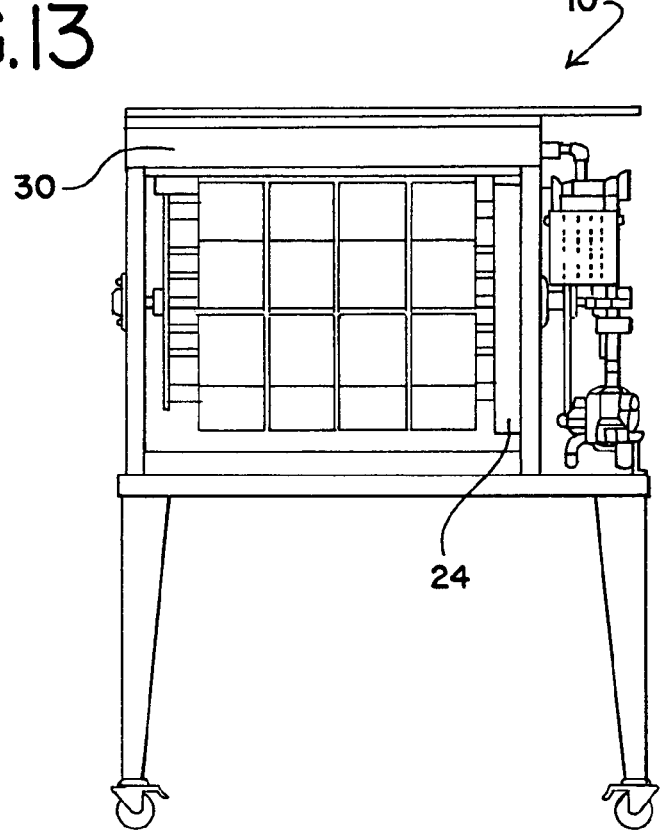
FIG. 13 is a front elevation view of the oven of FIG. 12.

The food item 12 is cooked by absorbing radiation from the blackbody radiator 30. FIG. 7 discloses a spectral absorption curve for water. The curve shows that the greatest and deepest radiation absorption for water occurs generally when the radiation is at a wavelength of 3–10 µm. Most food items have a high percentage of water. For example, meats such as chickens are approximately 70% water. Accordingly, it is desirable for the blackbody radiator 30 to emit radiation at the 3–10 µm wavelength as the mass of chickens is comprised of a large percentage of water. This is the highly effective wavelength for cooking the majority of meat products. Blackbody radiators, such as the iron radiator 30, will emit radiation at this wavelength. FIG. 8 discloses a curve showing the percentage of infrared radiation emitted from a blackbody radiator between 3 and 10 µm wavelength. The greatest percentage of radiation emitted occurs generally within the range of 400–1400 degrees Fahrenheit. Thus, by controlling the heat in the blackbody radiator 30, its radiative properties are also controlled. This allows one to control the cooking process. By modulating the blackbody radiator 30, different cooking profiles can be achieved from intense searing heat to soft gentle heat that can give an even golden color. In a preferred embodiment, the blackbody radiator 30 is heated to approximately 900 degrees Fahrenheit to maximize the percentage of radiation emitted at the 3–10 µm wavelength.

It is desirable to have as large a blackbody radiator 30 as possible. This increases the surface area that will emit radiation towards the food items 12 being cooked. It is further desirable to have as many interior surfaces of the oven to act as blackbody radiators. This further increases the surface area that will emit radiation to cook the food items. For example, the oven 10 of FIG. 2 is configured such that the entire housing 14 comprises the blackbody radiator 30, therefore, maximizing the surface area emitting radiation towards the food item 12. FIG. 9 discloses an iron radiator 100 similar to the iron radiator 30 utilized in the oven shown, for example, in FIG. 3. The radiator 100 has an inner surface 102 that is generally smooth and planar. The radiator 100 occupies a linear distance x. FIG. 10 discloses another radiator 110. The radiator 110 has a wavy inner surface 112. This increases the overall surface area of the inner surface 112. This increases the radiation emitting inner surface area 112 within the identical linear distance x.

Figure 4:
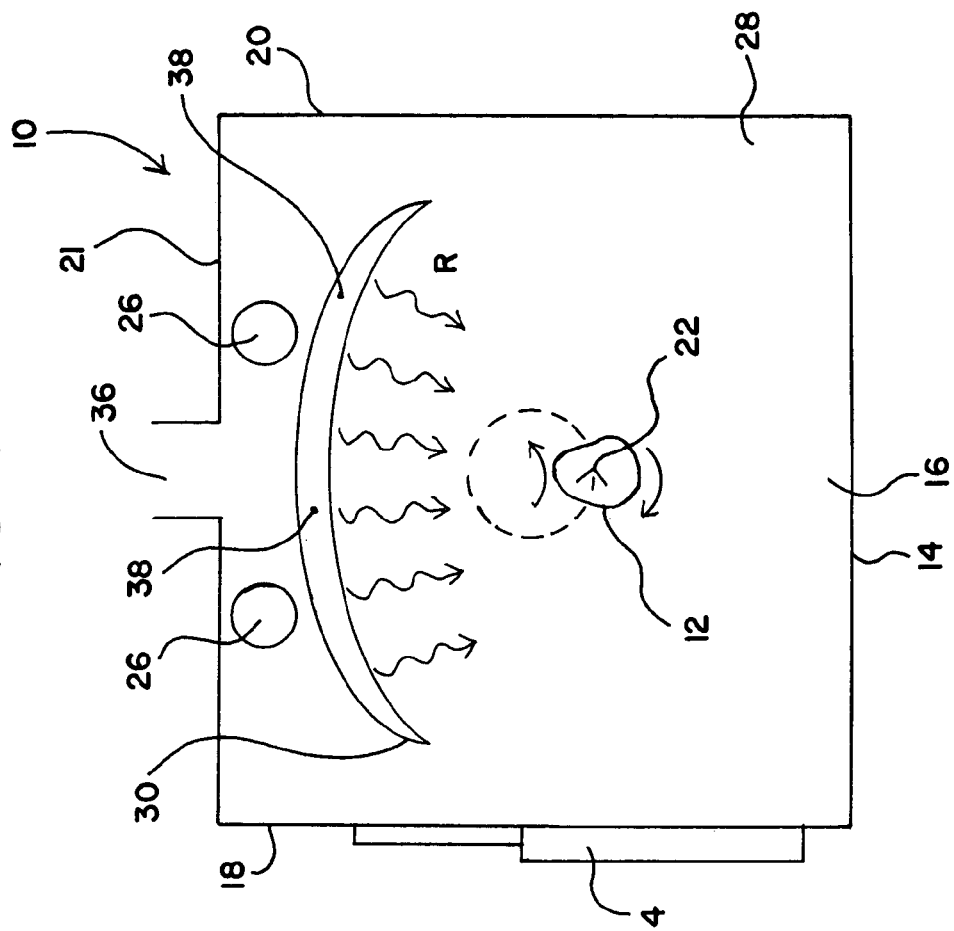
FIG. 4 is a cross-sectional schematic view of another embodiment of the rotisserie oven according to the present invention.

FIG. 4 illustrates an alternate embodiment of the oven 10 shown in FIG. 3. The heating element 26 is in the form of an infrared burner 26. In this particular embodiment, there are two infrared burners 26. The burners 26 are positioned adjacent the ceiling 21 of the housing 14. The blackbody radiator 30 is positioned below the burners 26. The blackbody radiator 30 also has a plurality of temperature sensors 38 for monitoring the temperature of the blackbody radiator 30. This embodiment is operated preferably within the parameters as described above. It is further understood that the oven 10 can have both a blackbody radiator 30 adjacent the second wall 20 and a blackbody radiator 30 adjacent the ceiling 21 to increase the cooking surfaces.

Figure 5:
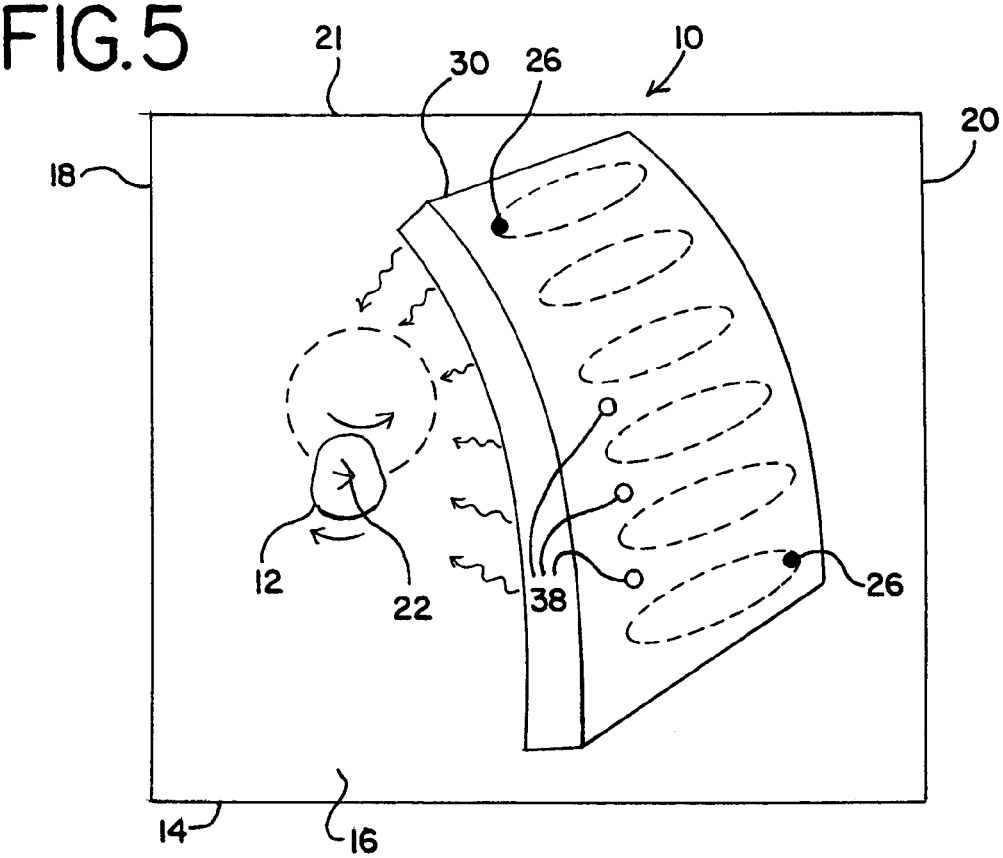
FIG. 5 is a cross-sectional schematic view of another embodiment of the rotisserie oven according to the present invention.

FIG. 5 illustrates another alternate embodiment of the oven 10 shown in FIG. 3. Similar to the embodiment illustrated in FIG. 2, the blackbody radiator 30 is positioned between the skewer 22 and the second wall 20 of the housing 14. However, unlike in FIG. 2, the heating element 26 is in the form of wire leads that are embedded within the blackbody radiator 30. Moreover, the blackbody radiator 30 has a plurality of temperature sensors 38 for monitoring the temperature of the blackbody radiator 30.

Figure 6:
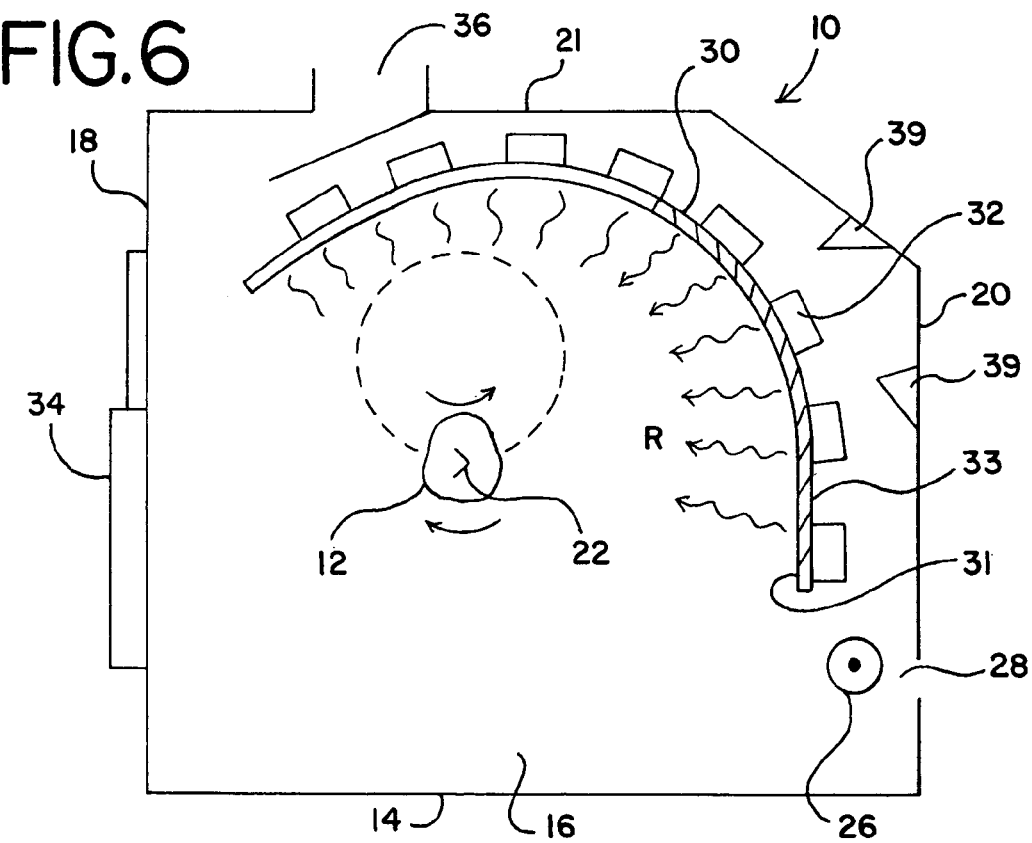
FIG. 6 is a cross-sectional schematic view of another embodiment of the rotisserie oven according to the present invention.

FIG. 6 illustrates yet another embodiment of the oven 10. The blackbody radiator 30 extends from the second wall 18 to across the ceiling 21 of the housing 14. A front portion of the blackbody radiator 30 slopes towards the front of the housing 14. The blackbody radiator 30 is shaped to provide a partial encapsulating configuration for the food item 12. This increases the radiation emitting surface area of the radiator 30. Also, air deflectors 39 are positioned on the second wall 18 and ceiling 21. The air deflectors direct heated air into the tabs 32 which, in turn, spread the heat into the blackbody radiator 30.

In another alternate embodiment of the oven 10 similar to the oven 10 shown in FIG. 1 or 3, the second wall 20 of the housing 14 can comprise the blackbody radiator 30. The heating element 26 is positioned within the second wall 20 of the housing 14, and the second wall 20 is directly heated and emits blackbody radiation. Likewise, the ceiling 21 of the housing 14 may comprise the blackbody radiator 30. Thus, it is contemplated that the housing 14 itself can comprise a blackbody radiator.

A method of cooking a food item in an oven is also disclosed. The method includes providing an oven having a housing defining an interior of the oven and including a first wall and a second wall opposite the first wall. The oven has a rotating member positioned between the first and second walls of the housing, and a drive mechanism mounted on the oven. The oven has a heating element positioned adjacent the second wall of the housing, and a blackbody radiator positioned between the rotating member and the heating element. An operator inserts the food item into the oven and the heating element heats the second side 33 of the blackbody radiator to a temperature between 700 and 1100 degrees Fahrenheit. The first side 31 of the blackbody radiator 30 emits blackbody radiation toward the food item. The blackbody radiation cooks the food item to its desired temperature. It is understood that the heating elements could be gas, electric or other energy sources, including but not limited to other conductive designs.

A method can also include heating the blackbody radiator 30 to approximately 900 degrees Fahrenheit. The food item 12 is heated until an internal temperature of 185 degrees Fahrenheit is reached and its outer surface has a nice golden brown color. The heat is gradually removed from the radiator 30. At the end of the process, the radiator 30 is not heated for a short period of time while the food item remains in the oven to complete the cooking process.

Further, a method of self-cleaning a rotisserie oven without damaging components therein is disclosed. Using the blackbody radiator 30 eliminates the need for using open-faced burners, spark/pilot ignition systems and ceramic heating members. These items are susceptible to water damage. Because the oven 10 does not utilize these elements, the oven 10 can be sprayed down with a cleaning solution.

FIG. 11 depicts one preferred embodiment of a self or auto-cleaning system 40. The system includes a controller (not shown), a cleaning solution reservoir 42, a neutralizing or rinsing solution reservoir 44, a water source (not shown), a delivery conduit 46 and a plurality of jets 48. The water source is connected to the delivery conduit 46 via a water solenoid 50. The cleaning solution reservoir 42 is connected to the delivery conduit via delivery pump 52 and the rinsing solution reservoir 44 is connected to the delivery conduit 46 via dispensing pump 53. In a most preferred embodiment, the delivery conduit 46 is in turn connected to a main or center shaft 54 of the drive mechanism 24. The center shaft 54 is generally tubular. The plurality of jets 48 are mounted to the center shaft 54. The delivery conduit 46, center shaft 44 and jets 48 together form part of a flow path of the auto-cleaning system 40. It is understood that the jets 48 could be mounted at other locations in the oven 10.

During the cleaning cycle, the controller opens the water solenoid 50 for a predetermined period of time and water flows into and through the delivery conduit 46, center shaft 54 and out through the jets 48. The center shaft 54 is rotated generally concurrently with the opening of the water solenoid 50 to permit maximum coverage of the interior 16 of the housing 14. The controller then meters cleaning solution having a de-greasing agent into the system 40 via pump 52. Water flowing through the delivery conduit 46 causes the cleaning agent to likewise flow though the delivery conduit 46, the center shaft 54 and out through the jets 48. Due to the rotation of the center shaft 54, the cleaning agent coats substantially all surfaces of the interior 16 of the housing 14. The cleaning agent aids in the removal of baked on carbon and food product 12 deposits resulting from the previously described cooking process. When the desired coverage is reached, the controller may shut down the pump 52 and the solenoid 50 and stop rotation of the center shaft 54 for a predetermined period of time. This allows the cleaning agent sufficient time to act on the carbon and food deposits.

Then the controller will again open water solenoid 50 and begin rotation of the center shaft 54 to begin the rinsing portion of the cycle. Additionally, the controller meters a rinsing solution having a neutralizing agent for pH concerns into the system via pump 53. As mentioned, pump 53 connects the rinsing solution reservoir 44 to the delivery conduit 46. Water flowing through the delivery conduit 46 causes the rinsing solution to likewise flow though the delivery conduit 46, the center shaft 54 and out through the jets 48. Due to the rotation of the center shaft 54, the rinsing solution coats substantially all surfaces of the interior 16 of the housing 14. The rinsing solution assists in rinsing the carbon and food deposits and any remaining cleaning agent, out of the housing. The controller then turns off pump 53. The water solenoid remains open for a period of time to allow the system to be completely flushed of any cleaning or rinsing solution and to allow the interior 16 of the housing 14 to be completely flushed of carbon and/or food deposits and of any remaining de-greasing agent.

Other embodiments of the auto-cleaning system 40 may include rotating spray heads or nozzles in place of or in addition to the described jets 48. Additionally, fixed heads may be placed in critical areas or hard to clean areas to reach certain carbon/food deposits of the cooking cycle.

Figure 14:
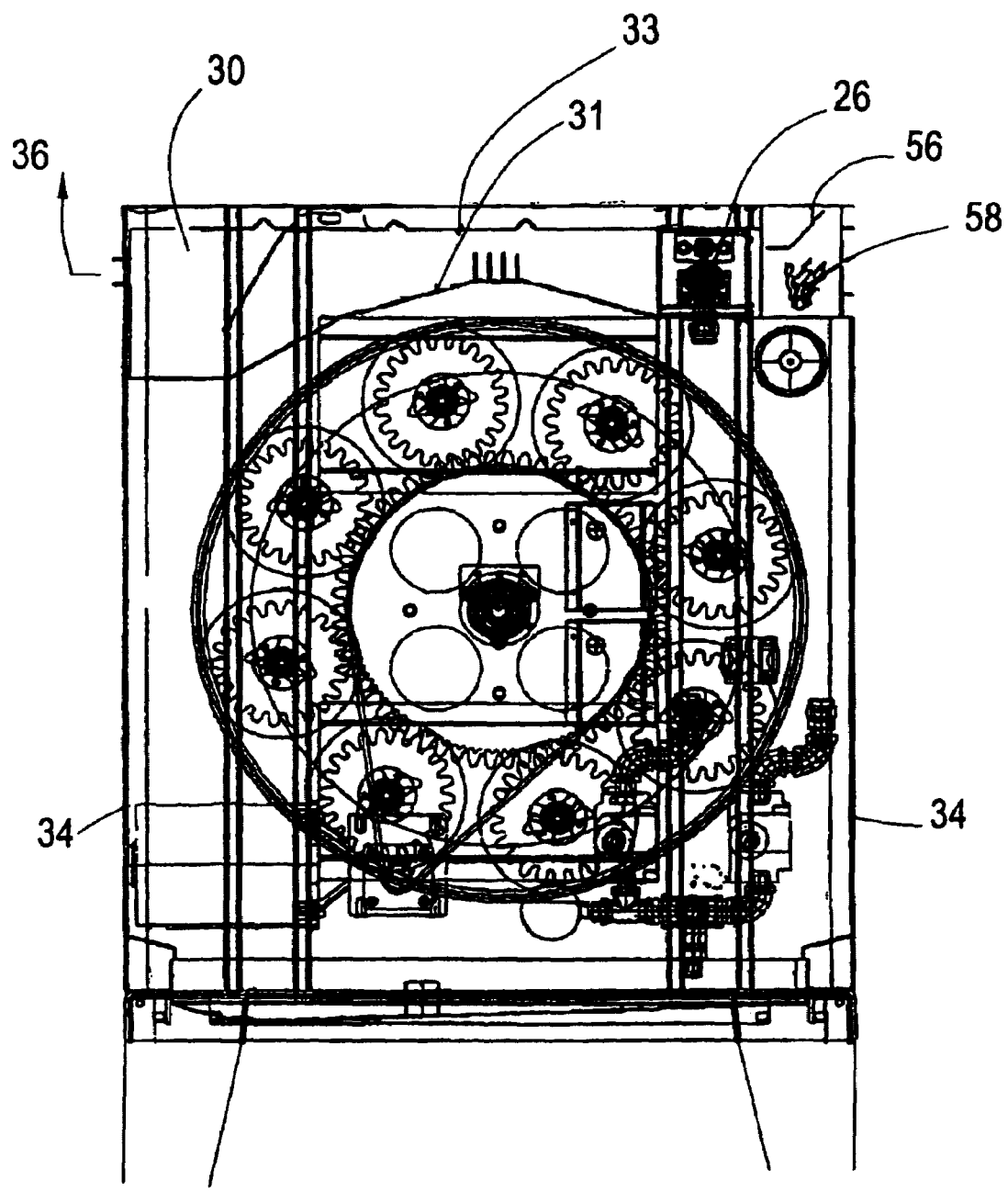
FIG. 14 is a schematic end view of the oven of FIG. 12.

FIGS. 11 and 14 show an enclosed plenum 56 for housing a decorative flame 58. The decorative flame 58 is positioned generally remote from the cooking cavity of the housing 14 of the oven 10. The enclosed plenum 56 is generally located between the first wall 18 and second wall 20 of the housing 14 immediately above the access door 34. The plenum 56 is separate from the rest of the interior 16 of the housing 14. The decorative flame 58 provides an increased visual enhancement of the oven 10. The decorative flame 58 is positioned such that its view is not obstructed by food product within the oven 10. In alternative embodiments, the decorative flame 58 may be located elsewhere within the interior 16.

Figure 15:
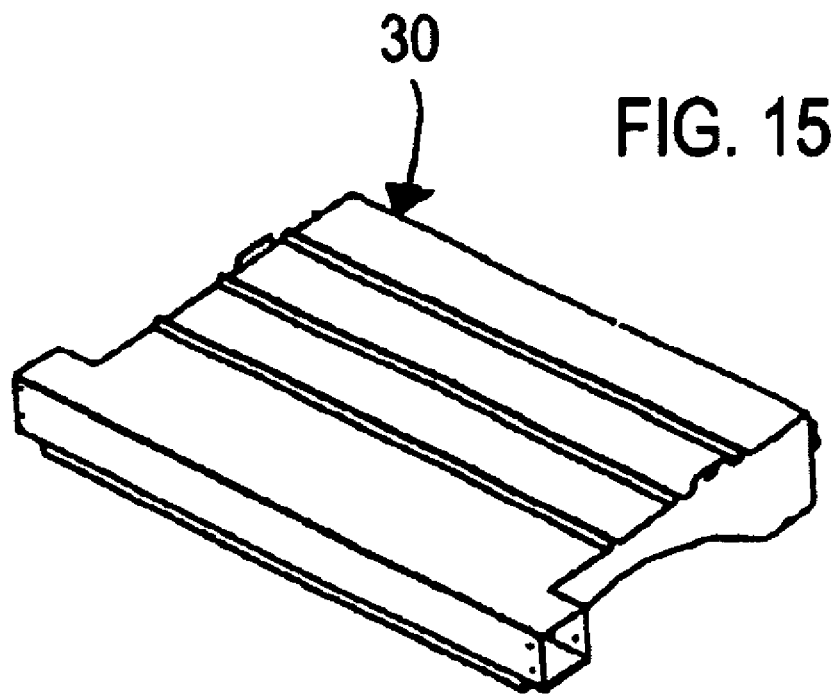
FIG. 15 is a perspective view of a blackbody radiator of the oven of FIG. 14.
Figure 16:
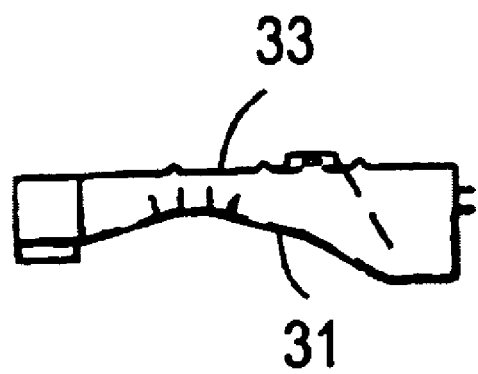
FIG. 16 is a side elevation view of the blackbody radiator of FIG. 15.
Figures 17B, 17C:
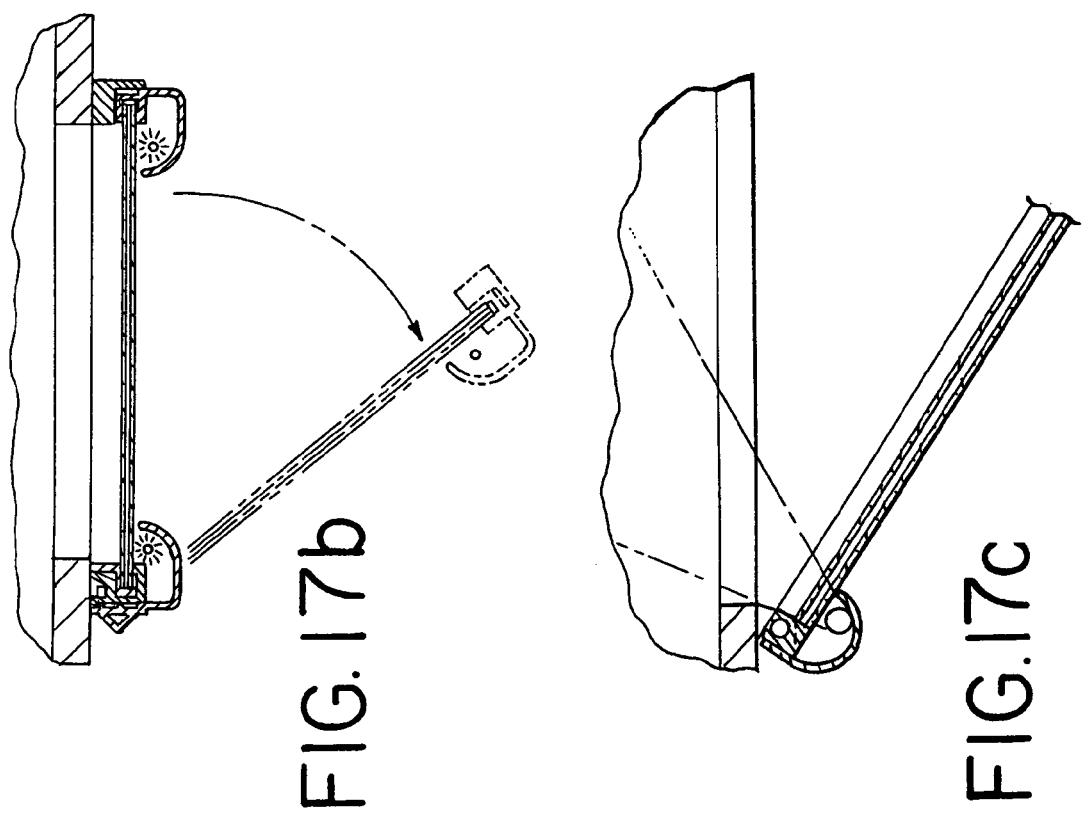
FIGS. 17(a)–(c) are perspective views of another embodiment of an oven of the present invention.
Figure 17A:
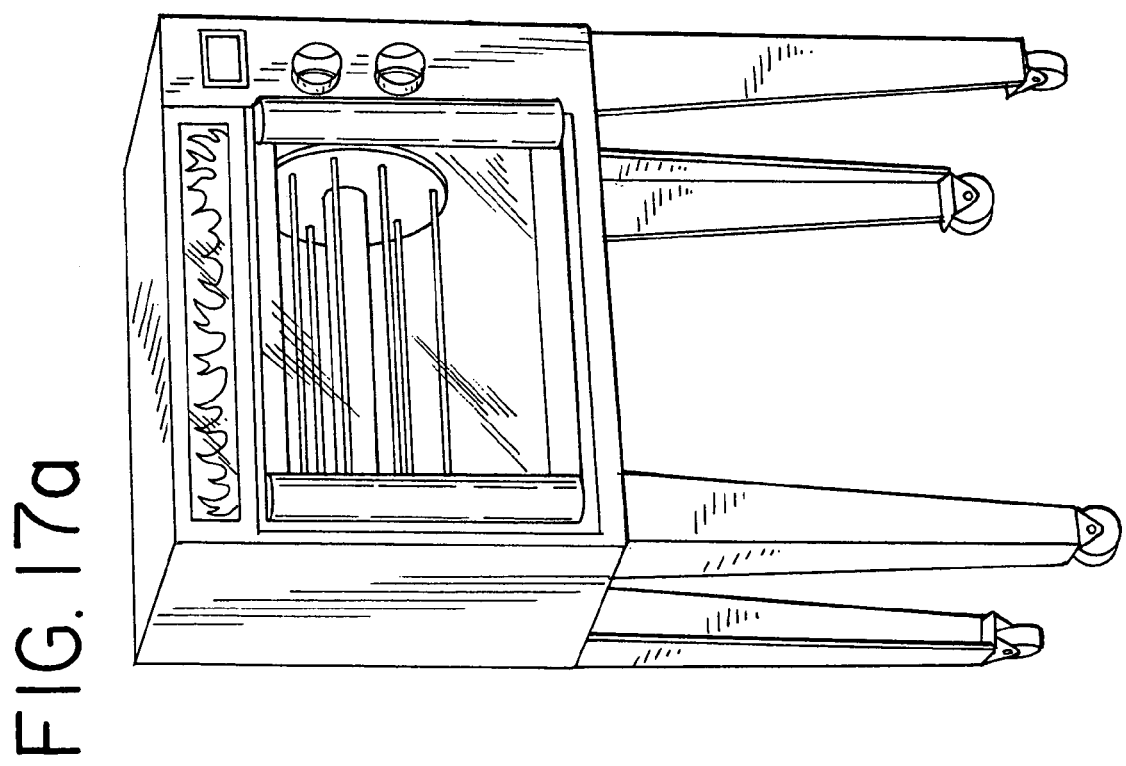
Figure 24:
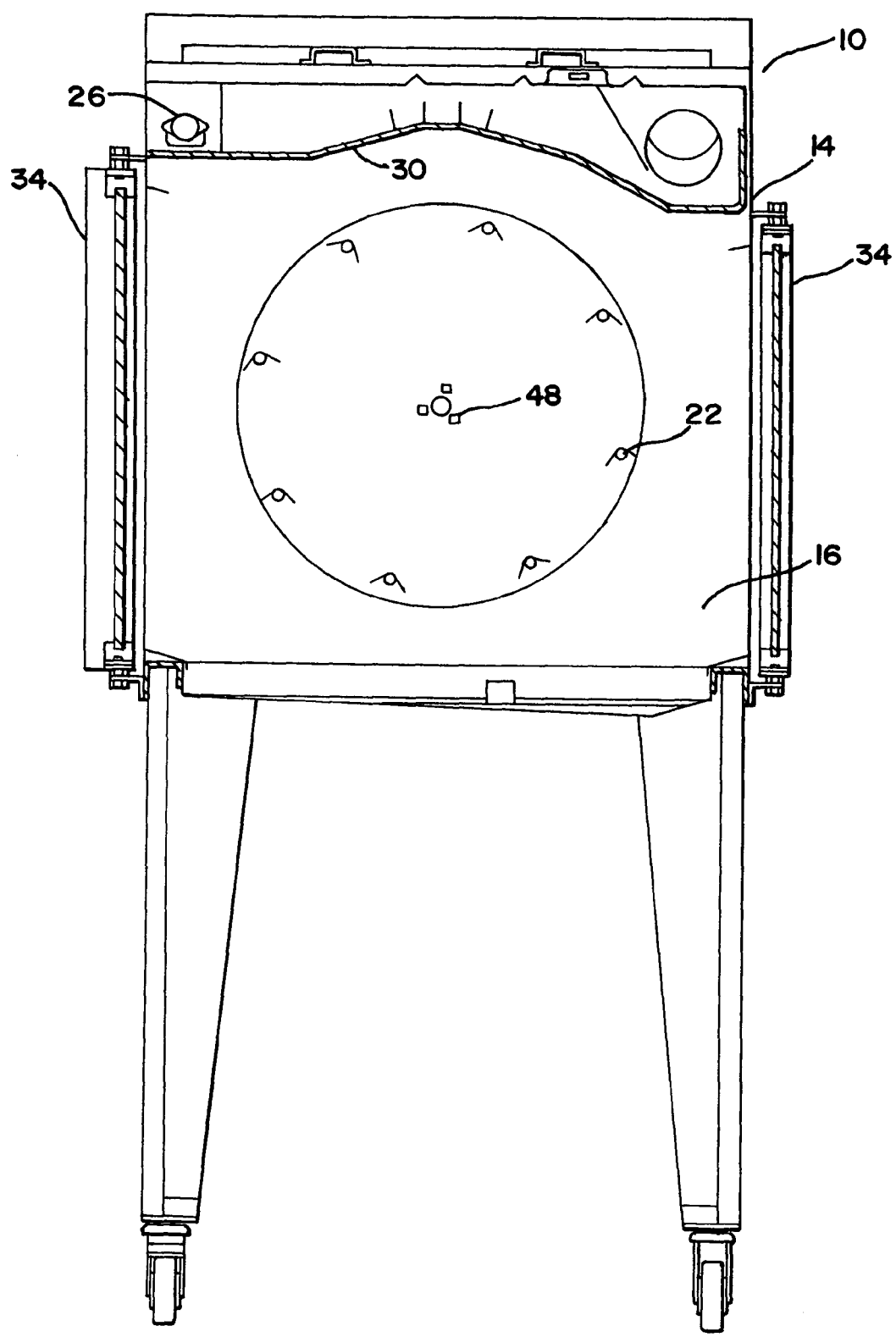
FIG. 24 is a sectional view along the line A—A of FIG. 18.
Figure 25:
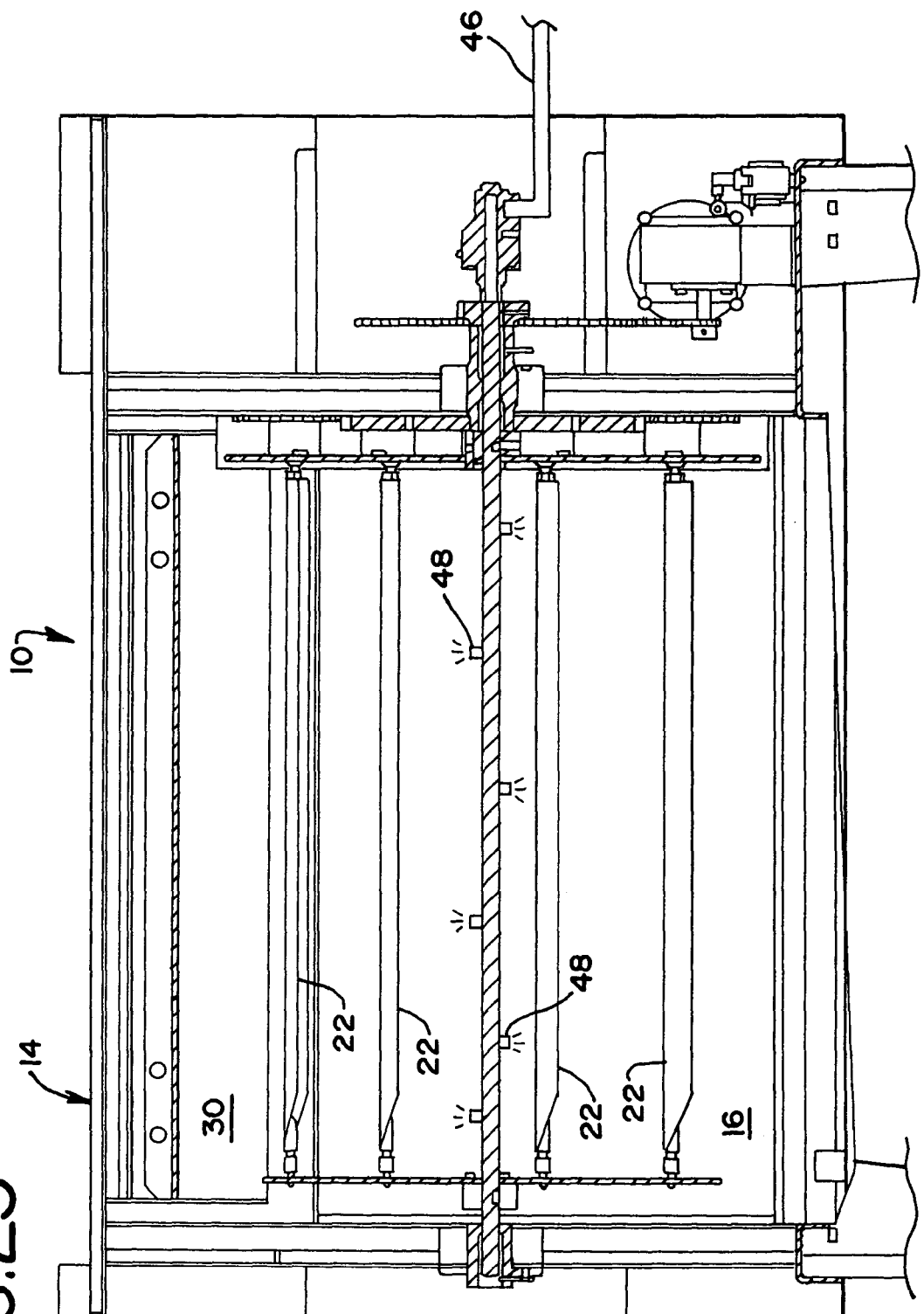
FIG. 25 is a sectional view along the line B—B of FIG. 21.

FIGS. 12–25 show another preferred embodiment of the oven 10 of the present invention. FIGS. 18–21 show various views of the oven. As shown in FIG. 14, 19 & 21, the oven 10 has both front and rear access doors 34 wherein the oven constitutes a pass-through design. As shown in FIGS. 17(a)–(c), the front door 34 and/or rear door 34 may have integral lighting. FIGS. 15, 16 & 24 generally show the black body radiator 30. FIG. 24 shows a cross sectional view along the line A—A of FIG. 18 and FIG. 25 shows a cross sectional view along the line B—B of FIG. 21. FIG. 25 further shows the planetary gear system driven by gear motor. The delivery conduit 46 for the auto-cleaning system is connected to a rotary joint at an end of the center shaft 54 having cleaning jets 48. As shown, the blackbody radiator 30 is located at or near the top of the interior of housing 14. Accordingly, the heating element 26, in the form of a burner, is also located near the top of the interior 16. This orientation of the heating element 26 has several advantages.

In known rotisserie ovens, the heating element 26 has been located near the bottom of the interior 16. In such a location, the heating element 26 heats the entire interior 16 and all surfaces thereof to high temperatures. Without the use of proper caution, this has the potential to create a hazardous condition for an operator of the oven 10 in the form of an increased risk of burn or other injury. Also, while it is known to have front and rear access doors 34 in a rotisserie oven, their usefulness is severely hampered by the location of the a heating element 26 near the bottom of the interior 16. This is due to the proximity of the heating element to either or both of the access doors 34.

In locating the heating element 26 near the top of the interior 16, the temperature of the interior during the cooking cycle is reduced as compared to that of known ovens. This eliminates the need for a cool down period and reduces the risk of burns or other injury to an operator of the oven 10. This improves the ability of operators to use both access doors 34 as no heat source is located in close proximity to either door 34.

The present invention controls the heat in the blackbody radiator 30, and thus, effectively controls the radiative properties from the radiator. Because the present invention provides the ability to control the radiative properties from the blackbody radiator, the cooking process is, therefore, also controlled. The blackbody radiator 30 can be adjusted to allow for different cooking profiles ranging from intense searing heat to soft gentle heat that give even golden color. Preferably, the back wall and the top of the housing act as blackbody radiators. This greatly increases the surface area of the housing that emits radiation for cooking. In other designs, such as a pass-through design, where the oven has two doors, one each on opposite sides of the housing, only the top of the housing acts as a blackbody radiator. Other designs may include reflective surface on the doors to increase surface area of product exposed to blackbody effects. By incorporating as much of the cooking cavity as the blackbody radiator, and by providing the energy in a focused way, drastically lowered cook times are achieved.

By using the blackbody radiator, such as the iron radiator 30, radiation is emitted in the highly effective spectrum, namely, in the 3–10 μm wavelength. The temperature that the blackbody emits radiation effectively for cooking food, within the 3–10 μm wavelength, is in the range of 400 to 1400 degrees Fahrenheit. At this temperature, 60% of the blackbody radiation is within the 3 to 10 μm range, with peak effectiveness in excess of 70% at the peak of the bell curve at 900 degrees Fahrenheit. In conventional designs, heat is used where radiation is emitted at an undesirable wavelength that cannot be as effectively absorbed by the food item. Higher temperatures are also required using more energy. Thus, in the present invention, the food items are cooked faster (i.e. greater radiation absorption) and with less energy. For example, in conventional rotisserie ovens using infrared burners, a normal time that 25–3½ lb. chickens can be cooked is approximately 1 hour and 30 minutes. By using a blackbody radiator in accordance with the present invention, the same 25–3½ lb. chickens can be cooked in only 45 minutes. Furthermore, because lesser temperatures are required, less energy is used. Thus, the energy is used in a more efficient manner.

The present invention utilizes blackbody radiation to cook food items. The invention is applicable to all cooking applications and includes applications that use variable temperature in the blackbody radiator to effectively cook food products. A rotisserie oven is one example of an oven that can utilize a blackbody radiator and includes various configurations ranging from vertical, horizontal, singular and plural skewer designs. The invention can also be utilized in any flat or vertical conveyorized designs, such as vertical ovens or pizza conveyor ovens.

While the specific embodiment has been illustrated and described, numerous modifications come to mind without significantly departing from the spirit of the invention, and the scope of protection is only limited by the scope of the accompanying claims.

The invention claimed is:

1. An apparatus for cooking a food item comprising:
   a housing;
   a stainless steel blackbody radiator positioned within the housing and proximate a top of the housing;
   a heating element operably coupled to the blackbody radiator to heat the blackbody radiator, the heating element positioned between the blackbody radiator and the top of the housing, wherein the blackbody radiator emits radiant energy generally within the 3–10 μm wavelength; and
   a cleaning system operably coupled to the housing, the cleaning system having a liquid delivery conduit in communication with an interior of the housing.

2. The apparatus of claim 1 wherein the heating element heats the blackbody radiator to generally within a range of 400 to 1400 degrees Fahrenheit.

3. The apparatus of claim 2 wherein the heating element heats the blackbody radiator to generally approximately 900 degrees Fahrenheit.

4. The apparatus of claim 1 wherein the heating element operably coupled to the blackbody radiator is a burner that heats a surface of the blackbody radiator.

5. The apparatus of claim 1 wherein the heating element comprises a plurality of heating wire leads.

6. A rotisserie oven for cooking a food item, comprising:
   a housing;
   a blackbody radiator positioned within the housing and proximate a top of the housing;
   a heating element operably coupled to the blackbody radiator to heat the blackbody radiator, wherein the blackbody radiator emits radiant energy generally within the 3–10 μm wavelength; and
   a rotating member operably coupled to the housing and capable of engaging and rotating the food item.

7. A rotisserie oven for cooking a food item, comprising:
   a housing;
   a blackbody radiator positioned within the housing and proximate a top of the housing, the blackbody radiator having a substantially concave inner surface defined by a plurality of faces facing toward an interior of the housing;
   a heating element operably coupled to the blackbody radiator to heat the blackbody radiator; and
   a rotating member operably coupled to the housing and capable of engaging and rotating the food item, the rotating member positioned within the housing and spaced from the blackbody radiator.

8. A rotisserie oven for cooking a food item, comprising:
a housing having a first side and a second side opposing the first side;
a blackbody radiator positioned within the housing;
a heating element operably coupled to the blackbody radiator to heat the blackbody radiator; and
an automated cleaning system operably coupled to the housing, the cleaning system comprising a cleaning solution reservoir and a rinsing solution reservoir in communication with a liquid delivery conduit extending into the housing, a first support structure located on the first side of the housing, and a second support structure located on the second side of the housing, the first and second support structures supporting the conduit within the housing and proximate a center of the housing, wherein the system injects a cleaning solution from the cleaning solution reservoir into the housing through the conduit and then the system injects a rinsing solution from the rinsing solution reservoir into the housing through the conduit.

* * * * *